(12) United States Patent
Spielmannleitner

(10) Patent No.: US 7,055,238 B2
(45) Date of Patent: Jun. 6, 2006

(54) METHOD AND DEVICE FOR CONNECTING TWO COMPONENTS AND AN ASSEMBLY OF THE COMPONENTS

(75) Inventor: Christian Spielmannleitner, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 89 days.

(21) Appl. No.: 10/193,704

(22) Filed: Jul. 12, 2002

(65) Prior Publication Data

US 2003/0024095 A1 Feb. 6, 2003

(30) Foreign Application Priority Data

Jul. 13, 2001 (DE) ................................ 101 34 086

(51) Int. Cl.
*B21D 39/00* (2006.01)
(52) U.S. Cl. .............................. 29/520; 29/515; 29/505
(58) Field of Classification Search ............... 29/421.1, 29/428, 433, 445, 453, 455.1, 505, 506, 508, 29/515, 516, 520
See application file for complete search history.

(56) References Cited

U.S. PATENT DOCUMENTS 3,977,068 A 8/1976 Krips
6,386,532 B1 * 5/2002 Donovan et al. ............. 269/25

FOREIGN PATENT DOCUMENTS

EP        EP0343395        * 11/1989

* cited by examiner

*Primary Examiner*—John C. Hong
(74) *Attorney, Agent, or Firm*—Crowell & Moring LLP

(57) ABSTRACT

A method and device for connecting two components by way of high fluid pressure are provided, the components being pushed onto one another, and the two components then being pressed against one another by way of the high pressure. In order to interconnect components in a relatively simple and controlled manner without any limitation with regard to the minimum size of an inside diameter of the components and with regard to the design of the inner component, the outer component, the material of which has a yield point which is lower than that of the inner component, is plastically deformed by high-pressure action acting on the sliding assembly from outside, the inner component being elastically deformed. An assembly of the components is also provided.

40 Claims, 2 Drawing Sheets

METHOD AND DEVICE FOR CONNECTING TWO COMPONENTS AND AN ASSEMBLY OF THE COMPONENTS

BACKGROUND AND SUMMARY OF THE INVENTION

This application claims the priority of German Patent Document DE 101 34 086.9, filed Jul. 13, 2001, the disclosure of which is expressly incorporated by reference herein.

The invention relates to a method for connecting two components by high fluid pressure, the components being pushed onto one another and then being pressed against one another by way of the high pressure, and a device for connecting two components by way of high fluid pressure, comprising a high-fluid-pressure generator by which a sliding assembly of the components pushed onto one another can be acted on by the fluid pressure in such a manner that the components bear against one another in a press fit.

A generic method and generic device are known from, for example, U.S. Pat. No. 3,977,068. In this case, a tubular component is pushed into a through-hole of a plate-shaped component with play, after which an expanding lance is inserted into the tubular component, by means of which lance the tubular component is, by high internal fluid pressure, plastically expanded in such a manner that it comes to bear against the inside of the through-hole of the plate-shaped component. The latter is likewise expanded in the region of the hole, but only within the limit of the material elasticity. After the high internal pressure has been released, the hole wall recovers elastically, so that a virtually permanent press fit results, in the hole region, between the tubular component and the plate-shaped component. The expanding lance is formed by a rod made of a rigid solid material, preferably steel, which has an axially extending pressure duct for guiding the pressure fluid. The axial pressure duct is a blind bore and opens, shortly before its end, into two ducts which branch off radially and have their outlets in the lateral surface of the rod. In the in-use position of the expanding lance, the outlets lie inside the region to be expanded of the tubular component. This region is sealed axially so as to be resistant to high pressure by two annular seals which are spaced from one another and are accommodated in two annular grooves let into the lateral surface of the rod.

As the expanding lance is inserted into a tubular component and, for reasons of strength, has to have a specific minimum cross section depending on the high pressure to be applied, the inner component must necessarily likewise have a minimum inside diameter. Applicability to inner components with a small inside diameter is thus not possible with the known art. Moreover, the necessity of inserting the expanding lance makes it a prerequisite that the inner component must be hollow. On account of the limited long-term strength of the expanding lance, in particular in the case of thinner examples, use of the lance in series production leads to a relatively expensive production process for the joint connection as a result of the frequent tool-changing owing to tool wear and the associated downtimes.

An aspect of the invention is, therefore, to develop a method and a device to the effect that components can, in a relatively simple and controlled manner, be interconnected without any limitation with regard to the minimum size of an inside diameter of the components and with regard to the design of the inner component.

According to certain preferred embodiments of the invention, this aspect is achieved in that an outer component of the two components, the material of which has a yield point which is lower than that of an inner component of the two components, is plastically deformed by high-pressure action acting on the two components from outside, the inner component being elastically deformed, with regard to the method; and in that the deforming tool surrounds the sliding assembly at least at a site of the press fit to be produced, wherein the deforming tool has a pressure duct which, connected to the high-fluid-pressure generator, leads from outside into an impression of the tool, which receives the sliding assembly, and an outlet of the duct is located at the site of the press fit to be produced, and wherein a sealing arrangement is arranged on an inner side of the impression on both sides of the site of the press fit to be produced, which sealing arrangements seal this site axially in a high-pressure-tight manner, with regard to the device.

Owing to the fact that the deforming action comes from outside, the requirement for inserting an expanding lance into an inner component is dispensed with. The dropping of the expanding lance means that there are no problems for the production process for the joint connection between the two components with regard to stability either, that is to say, wear of the tool to be inserted. As a result of this, the regular costs for the production of the connection are at the same time reduced. Furthermore, the shape of the inner component is no longer dependent on a minimum cross section of the lance. The inner components can thus now be polygonal, tubular, unsymmetrical, bent a number of times or even made of solid material The limited criteria for the controlled production of the joint connection are, on the one hand, the possibility of pushing the outer component onto the inner component and, on the other hand, the matching of the materials and, if appropriate, the wall thicknesses of the components to one another, so that, when acted on by pressure fluid, the outer component is deformed plastically and the inner component is deformed elastically. This is embodied in the existence of an extensively closed opening of the outer component, into or through which the inner component is pushed or inserted, and in the elastic recovery of the material of the inner component outwards against the plastically shrunk outer component after release of the fluid pressure. This gives rise to the press fit between the two components which is sought according to certain preferred embodiments of the invention and the strength of which can advantageously be matched to the application concerned by variable control of the level of the fluid pressure, so that all strengths of the press fit can be set selectively between non-detachability and detachability of the press fit occasioned as of a given axial mechanical tension or pressure or a torque, for example for overload protection.

The long-term strength of the device according to certain preferred embodiments of the invention is absolutely assured, as the solidity of the deforming tool can be selected freely depending on the method. The smallness of the outside diameter of the components is determined only by the constructional feasibility of sealing arrangements in terms of their miniaturization. In comparison with known generic methods, considerably smaller components can consequently be joined together.

Expedient developments of the invention emerge from the preferred embodiments. Other objects, advantages and novel features of the present invention will become apparent from the following detailed description of the invention when considered in conjunction with the accompanying drawings.

DETAILED DESCRIPTION OF THE DRAWINGS

Figure 1:
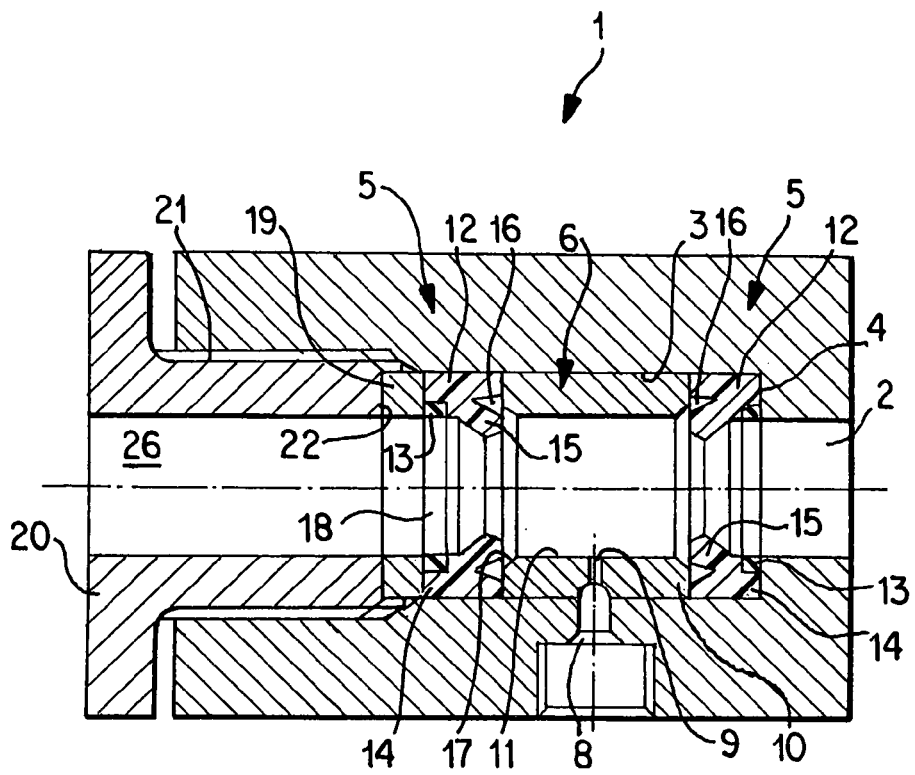
FIG. 1 shows a lateral longitudinal section of a deforming tool of a device without components to be joined.

FIG. 1 illustrates a deforming tool 1 of a device for connecting two components by way of high fluid pressure, which is of solid, one-piece design and has a passage which forms the tool impression 2. Instead of the simple design of the apparatus in one piece, the deforming tool 1 can also be divided into an upper die and a lower die, which affords advantages in terms of accessibility of the components to be joined, in particular when the components are introduced into the deforming tool 1 in a sliding assembly and have to remain accurately axially and/or radially positioned in relation to one another in the process. An all-round cutout 3, which is open on one side axially, is recessed into the impression 2. The cutout 3 receives two sealing arrangements 5, and a spacer sleeve 6 which spaces these from one another. The right side sealing arrangement 5 is supported against the axial stop face 4 of the cutout 3. The spacer sleeve 6 is supported axially against the right side sealing arrangement 5, and the other, left side sealing arrangement 5 is in turn supported axially against the spacer sleeve. Although it would also be possible to insert the sealing arrangements 5 into annular grooves in the impression 2 which are axially separated from one another, and a spacer sleeve 6 would then be omitted, the solution illustrated affords clear advantages in terms of the insertability or exchangeability of the sealing arrangements 5 in the event of wear of the sealing arrangements or in the event of the use of different—larger or smaller—sealing arrangements in the case of a change in application to larger or smaller components or to components of different cross-sectional shape.

Figure 4:
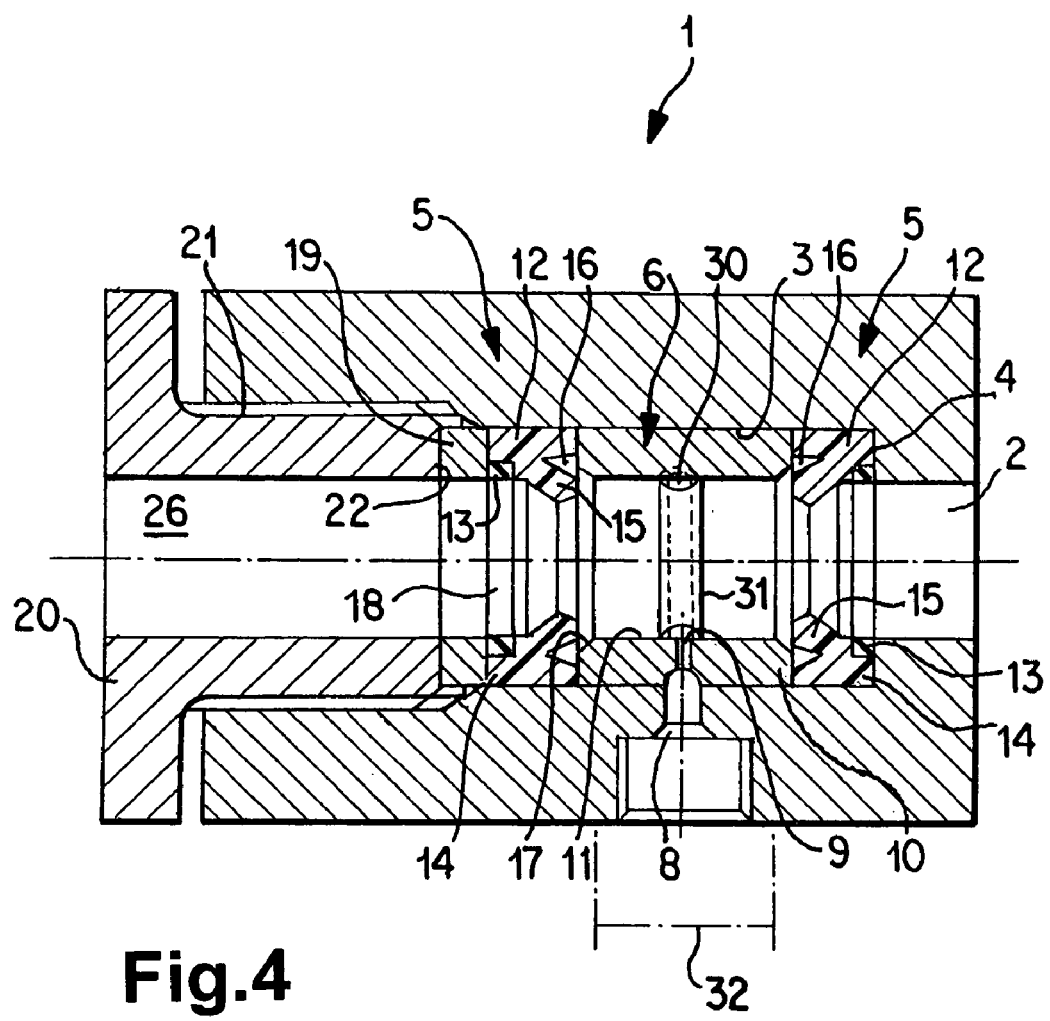
FIG. 4 shows a lateral longitudinal section of a deforming tool according to a preferred embodiment.

The deforming tool 1 has a pressure duct 8 which is connected on one side to an external high-fluid-pressure generator 32 and leads from outside into the impression 2 of the tool 1, which receives the sliding assembly. The outlet 9 of the pressure duct 8 is located at the site of the press fit to be produced. In this connection, the pressure duct 8 extends in a simple manner through the wall 10 of the spacer sleeve 6, the inner side 11 of which forms the majority of the impression 2 of the deforming tool 1 along the site of the press fit to be produced, which simplifies the design of the deforming tool 1 and increases the compactness of the tool 1. In order to achieve as uniform as possible a pressure action on the sliding assembly at the site of the press fit to be produced, an all-round recess 30 can be let into the impression 2 in the event of the absence of a spacer sleeve 6 or into the inner side 11 of the spacer sleeve 6, into which recess the pressure duct 8 opens, and which recess extends along the site of the press fit to be produced, as shown in FIG. 4. This is especially advantageous when the sliding assembly lies closely against the impression 2 or the inner side 11 of the spacer sleeve 6.

It is also conceivable for the outlet 9 of the pressure duct 8 or said recess to be covered by an elastic diaphragm 31 towards the impression 2, which diaphragm 31 is fastened to the impression 2 or the inner side 11 of the spacer sleeve 6. Dry deformation of the sliding assembly is achieved by way of the diaphragm 31, the diaphragm 31 being applied against the outer component of the sliding assembly in a pressure-conveying manner when fluid pressure is generated. This is advantageous on the one hand for protecting corrosion-sensitive component materials and on the other hand for conserving resources. Over and above this, sealing arrangements can be forgone, simplifying the tool.

The sealing arrangements 5 comprise an elastic sealing ring 12 made of a thermoplastic elastomer, the low abrasion of which during insertion and withdrawal of the sliding assembly of the components guarantees great long-term durability, and, on the side facing away from the site of the press fit to be produced, an adjacent support ring 13 made of a material of high Shore hardness. The support ring 13 is made of a material resistant to high pressure, is radially elastic and has very great tensile strength in the axial direction. Bronze or a spring steel are possible materials for the support ring 13. The use of a linear aromatic polymer or a polyoxymethylene plastomer has proved to be particularly favourable with regard to fulfilling the requirements to be met by the support ring 13.

The support ring 13 is surrounded by an axially projecting flange 14 of the sealing ring 12, by virtue of which the support ring 13, fastened under prestress, presses the sealing ring 12 radially against the wall of the cutout 3 at the site of the flange 14 and thus affords the sealing ring 12 additional hold in the cutout 3. The sealing ring 12 also has an all-round sealing lip 15 which protrudes obliquely into the impression 2 of the deforming tool 1 and counter to the direction of the axial pressure component of the high pressure deforming the outer component and which is supported axially by the support ring 13 so as, when the high fluid pressure is generated, to avoid gap extrusions of the sealing ring 12 into the gap which is present, outside the high-pressure action, between the sliding assembly and the impression 2 and in which atmospheric pressure prevails and thus to minimize the wear of the sealing ring 12.

The sealing lip 15 has an outside diameter which is smaller than the outside diameter of the sliding assembly. As a result, when the sliding assembly is or the individual components are inserted into the impression 2 of the deforming tool 1, the sealing lip 15 is bent back by the sliding assembly or its components, so that the sealing ring 12 bears against the outside of the outer component of the sliding assembly under prestress and, thus, has a sealing effect even before the fluid pressure build-up. Over and above this, the sealing lip 15 bridges the gap between the inner side 11 of the spacer sleeve 6 and the outer component, which increases during the plastic deformation of the outer component, by elastic recovery into its initial position corresponding to the position of non-use before the insertion of the sliding assembly. In this respect, relatively large gaps can advantageously be bridged in a high-pressure-tight manner.

Recessed into the sealing ring 12 is a notch-shaped annular groove 16 which is open in the axial direction towards the spacer sleeve 6 and the outer flank of which forms the upper side of the sealing lip 15. The annular groove 16 gives the sealing lip 15 sufficient elasticity that it is capable of being applied as closely as possible against the outer component of the sliding assembly to guarantee adequate sealing ability. In this connection, the depth of the annular groove 16 should not be dimensioned so large that a risk of tearing the sealing ring 12 arises, but it should be large enough to ensure sufficient elasticity of the sealing lip 15.

On its face on both sides, the spacer sleeve 6 has an all-round chamfer 17, via which the pressure duct 8 can be connected fluidically to the annular groove 16 of the sealing ring 12. As a result, when high fluid pressure is generated, the sealing lip 15 is acted on by way of the pressure fluid additionally via the annular groove 16, so that the lip is pressed against the outer component of the sliding assembly with great force, bringing about complete high-pressure-tightness. In this context, the inclination of the sealing lip 15 proves advantageous, as a radial component of the fluid high pressure can act on the lip 15.

Arranged at the open end 18 of the cutout 3 is an end ring 19 made of an inelastic material, which bears in an axially supporting manner against the left side sealing arrangement 5. The device also comprises an axial piston 20, by way of which the end ring 19 can be acted on. The axial piston 20 is inserted into a cross-sectionally widened bore 21 adjacent to the open end 18 of the cutout 3 and holds the sealing arrangements 5 and the spacer sleeve 6 in position counter to the high pressure during production of the joint connection, by supporting the end ring 19. The end ring 19 as a component part is necessary, in certain preferred embodiments, owing to the conically tapering bore run-out and bridges the distance, adjoining the run-out, between the left side sealing arrangement 5 and the end face 22 of the axial piston 20.

It is also conceivable to use the axial piston 20 to cause an axial force to act on the sealing arrangements 5 even before the build-up of the high fluid pressure. When the sliding assembly has been inserted, these sealing arrangements are, owing to their elasticity, pressed together axially by the piston 20, as a result of which the sealing rings 12 expand radially inwards and are applied against the sliding assembly with considerable force, which already leads to a great sealing effect at the outset, that is to say before high fluid pressure build-up. In order to be capable of offering resistance to the high fluid pressure, the axial piston 20 is hydraulically operated. In the illustrative embodiment depicted, however, the hydraulics are forgone by designing the axial piston 20 in the form of a hollow screw which is screwed into an internal thread of the bore 21. A possible alternative to this is for the axial piston 20 and the bore 21 to be designed in such a way that they interact in the manner of a bayonet closure.

In an advantageous arrangement of the invention, the sealing arrangements 5 can be integrated into a sealing module which can be inserted into an all-round cutout of the impression 2 of the deforming tool 1. In addition to the sealing arrangements 5, the module also comprises the spacer sleeve 6, which spaces the two sealing arrangements 5 from one another, and a carrier for the sealing arrangements 5 and the spacer sleeve 6. As a result of this, it is possible in a simple manner to customize the resetting of the device according to certain preferred embodiments of the invention for different applications. In this connection, it is only necessary to have preassembled modules available, which can then be removed rapidly from the deforming tool 1 and exchanged. The sealing arrangements 5 and the spacer sleeve 6 can consequently be exchanged as a whole and do not have to be removed and fastened individually. The end ring 19 can also constitute a further component of the module, as this ring has to be matched to the diameter of the left side sealing arrangement 5 and therefore likewise has to be changed on exchange of this arrangement.

Figure 2:
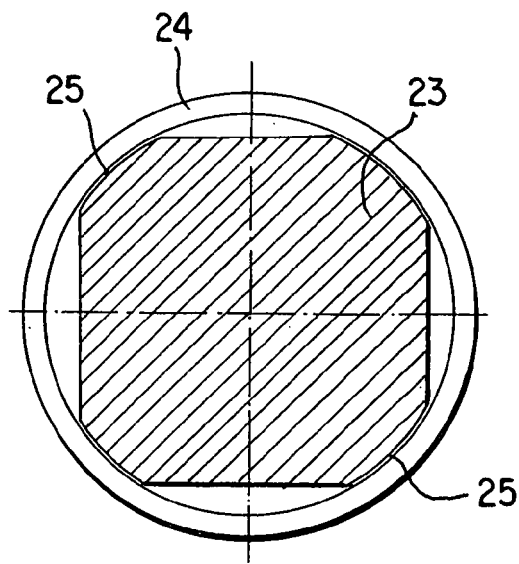
FIG. 2 shows a cross section of an outer component and an inner component in sliding position before the production of a press fit.

The method for connecting two components by way of high fluid pressure is carried out as follows. Two components, an inner component 23 and an outer component 24, are pushed onto one another in a suitable manner, so that some overlapping or even complete overlapping of the two components 23, 24 is achieved, which are then loosely interconnected in a sliding fit (FIG. 2). The inner component 23 can be hollow, but in the depicted case consists of solid material and has a polygonal cross section, the corners being interconnected by a curvature 25 of the solid material. During subsequent pressing against the outer component 24, this curvature 25 makes possible smooth contact and at the same time prevents a notch effect which damages both component and connection. Alternatively, the component 23 can also have any other shape. Here, the component 24 is cylindrical, but can also have other hollow cross-sectional shapes.

The sliding assembly can be assembled outside the deforming tool 1 and then inserted—or, in the case of a divided tool 1, placed—into the deforming tool 1. It is also conceivable for the sliding assembly to be assembled in the deforming tool 1, in which case it is constructionally preferable for it to be possible to insert the individual components 23 and 24 into the impression 2 of the deforming tool 1 from both its sides. The insertion of the sliding assembly into the impression 2 can also take place when the deforming tool 1 is closed, that is to say when the axial piston 20 is inserted or screwed into the bore 21 and bears against the end face of the end ring 19. In the case of relatively long components 23, 24, or in the case of the sliding assembly being assembled in the tool 1, the axial piston 20 has, in the case of the closed tool 1, an axial passage opening 26 which is aligned with the impression 2 of the tool 1 and the spacer sleeve 6 and through which the sliding assembly or one of the two components 23, 24 is guided.

High fluid pressure is then applied, by the external high fluid-pressure generator being actuated and conducting a pressure fluid via the pressure duct 8 to the sliding assembly between the sealing arrangements 5. The pressure fluid is then pressurized until a deforming pressure is reached, at which the outer component 24 of the sliding assembly, the material of which has a yield point which is lower than that of the inner component 23, is plastically deformed in such a manner that it, as it were, shrinks onto the inner component 23. The deforming pressure is at just such a level that the inner component 23 is only elastically deformed, that is to say compressed. After the outer component 24 has been pressed thus onto the inner component 23, the high pressure is then released, whereupon the elastically compressed inner component 23 and the plastically deformed outer component 24 recover elastically.

Figure 3:
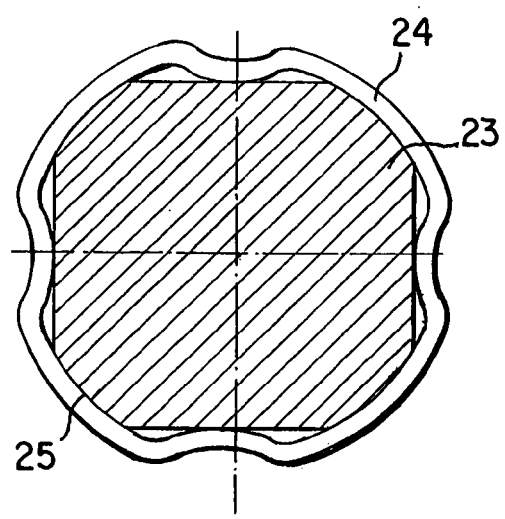
FIG. 3 shows a cross section of the components from FIG. 2 after the production of the press fit.

As the yield points of the two components 23 and 24 are different ($R_{e,23} > R_{e,24}$), the inner part 23 recovers by a greater amount than the outer part 24. A state of equilibrium is consequently brought about, in which the component 24 is under radial tensile stress and the component 23 is under compressive stress. At the interface, a sustained surface pressure and thus a strong joint connection are consequently achieved. The components 23 and 24 thus bear against one another, in a very strong press fit, in a frictionally locking manner and, on account of the rotational symmetry of the inner component 23 shown, in a positively locking manner at least at a number of circumferential sites, so that they are fixed to one another in both the axial and the radial direction (FIG. 3).

While the outer component 24 is acted on directly by the pressure fluid in the illustrative embodiment shown, the high pressure can also be transferred to the component 24 by way of a diaphragm arranged in the impression 2 or on the spacer sleeve 6. Furthermore, the outer component 24 does not necessarily have to be pressed together with the inner component 23 over the entire overlapping area of the sliding assembly, but this can take place over only an axial portion of the overlapping area according to the dimensioning of the spacing of the sealing arrangements 5 from one another. It is moreover possible within the scope of the invention, when a hollow, in particular tubular, inner component 23 is used and very high deforming pressures are required, to support the component 23 on the inside using a solid counterstay tool. Otherwise, the outer component 24 is pressed in a simple manner in terms of apparatus and method against the outer wall of the hollow inner component 23 without any support with regard to the inner component 23.

The invention can find application in, for example, body construction in carcass structures of vehicles, steering columns or in bumper bending members.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for connecting two components by high fluid pressure, comprising:
    providing an outer component of a material which has a first yield point and an inner component of a material which has a second yield point which is higher than the first yield point,
    sealing a site of a press fit connection to be provided between axially separated sealing arrangements, and
    pressing the outer component against the inner component so that the outer component is plastically deformed by the high fluid pressure acting thereon and the inner component is elastically deformed so as to produce said press fit connection and connect said two components.

2. Method according to claim 1, wherein the outer component is acted on directly by the fluid pressure.

3. Method according to claim 2, wherein the outer component is pressed against the inner component in a positively locking manner at least over a partial circumferential area.

4. Method according to claim 2, wherein the outer component is pressed together with the inner component over only an axial portion of an overlapping area of the two components.

5. Method according to claim 2, wherein the outer component is pressed against an outer wall of the inner component, which is hollow, without any support with regard to the inner component.

6. Method according to claim 1, wherein the outer component is pressed against the inner component in a positively locking manner at least over a partial circumferential area.

7. Method according to claim 6, wherein the outer component is pressed together with the inner component over only an axial portion of an overlapping area of the two components.

8. Method according to claim 6, wherein the outer component is pressed against an outer wall of the inner component, which is hollow, without any support with regard to the inner component.

9. Method according to claim 1, wherein the outer component is pressed together with the inner component over only an axial portion of an overlapping area of the two components.

10. Method according to claim 9, wherein the outer component is pressed against an outer wall of the inner component, which is hollow, without any support with regard to the inner component.

11. Method according to claim 1, wherein the outer component is pressed against an outer wall of the inner component, which is hollow, without any support with regard to the inner component.

12. Method according to claim 1, wherein each of the sealing arrangements includes an elastic sealing ring.

13. Method according to claim 12, wherein each of the sealing arrangements further includes a hard support ring adjacent the elastic sealing ring.

14. Method according to claim 13, wherein each sealing ring includes an axially projecting flange surrounding the support ring.

15. Method according to claim 14, wherein each sealing ring further includes a radially protruding sealing lip.

16. Method according to claim 15, wherein each sealing ring includes an annular groove adapted to promote elasticity of the sealing lip.

17. A method for connecting using fluid pressure, comprising:
    providing an outer component of a material having a first yield point and an inner component of a material having a second yield point which is higher than the first yield point,
    sealing a site of a press fit connection to be produced between axially separated sealing arrangements, and
    pressing the components against one another by way of the fluid pressure so that the outer component is plastically deformed by pressure acting on the components from outside and the inner component is elastically deformed so as to produce said press fit connection and connect the outer and inner components.

18. A method according to claim 17, wherein the outer component is acted on directly by the fluid pressure.

19. A method according to claim 17, wherein the outer component is pressed against the inner component in a positively locking manner at least over a partial circumferential area.

20. A method according to claim 17, wherein the outer component is pressed together with the inner component over only an axial portion of an overlapping area of the two components.

21. A method according to claim 17, wherein the outer component is pressed against an outer wall of the inner component, which is hollow, without any support with regard to the inner component.

22. A method according to claim 17, wherein each of the sealing arrangements includes an elastic sealing ring.

23. A method according to claim 22, wherein each of the sealing arrangements further includes a hard support ring adjacent the elastic sealing ring.

24. A method according to claim 23, wherein each sealing ring includes an axially projecting flange surrounding the support ring.

25. A method according to claim 24, wherein each sealing ring further includes a radially protruding sealing lip.

26. A method according to claim 25, wherein each sealing ring includes an annular groove adapted to promote elasticity of the sealing lip.

27. A connection assembly, comprising:
    an inner component, and
    an outer component having a material with a yield point lower than a yield point of a material of the inner component,
    wherein the components are pushed onto one another, a site of a press fit connection to be produced is sealed between axially separated sealing arrangements, and the components are pressed against one another by way of fluid pressure so that the outer component is plastically deformed by pressure acting on the two components from outside and the inner component is elastically deformed so as to produce said press fit connection and connect the outer and inner components.

28. A connection assembly according to claim 27, wherein the outer component is pressed against the inner component in a positively locking manner at least over a partial circumferential area.

29. A connection assembly according to claim 27, wherein the outer component is pressed together with the inner component over only an axial portion of an overlapping area of the two components.

30. A connection assembly according to claim 27, wherein each of the sealing arrangements includes an elastic sealing ring.

31. A connection assembly according to claim 30, wherein each of the sealing arrangements further includes a hard support ring adjacent the elastic sealing ring.

32. A connection assembly according to claim 31, wherein each sealing ring includes an axially projecting flange surrounding the support ring.

33. A connection assembly according to claim 32, wherein each sealing ring further includes a radially protruding sealing lip.

34. A connection assembly according to claim 33, wherein each sealing ring includes an annular groove adapted to promote elasticity of the sealing lip.

35. A method of making a connection between an inner component and an outer component using fluid pressure, comprising:
pushing an outer component of a material having a first yield point onto an inner component of a material which has a second yield point which is higher than the first yield point,
sealing a site of a press fit connection to be produced between axially separated sealing arrangements, and
pressing the components against one another by way of the fluid pressure so that the outer component is plastically deformed by the fluid pressure acting on the components from outside and the inner component is elastically deformed so as to produce said press fit connection and connect the inner component and the outer component.

36. A method according to claim 35, wherein each of the sealing arrangements includes an elastic sealing ring.

37. A method according to claim 36, wherein each of the sealing arrangements further includes a hard support ring adjacent the elastic sealing ring.

38. Method according to claim 37, wherein each sealing ring includes an axially projecting flange surrounding the support ring.

39. Method according to claim 38, wherein each sealing ring further includes a radially protruding sealing lip.

40. Method according to claim 39, wherein each sealing ring includes an annular groove adapted to promote elasticity of the sealing lip.

* * * * *